Nov. 1, 1955 R. B. IMMEL ET AL 2,722,649
ARCLESS SWITCHING DEVICE
Filed Aug. 9, 1954

WITNESSES:
E. A. McCloskey.
John B. Davidson

INVENTORS
Walter B. Guggi
and Ralph B. Immel.
BY
Paul E. Triefemann
ATTORNEY

United States Patent Office 2,722,649
Patented Nov. 1, 1955

2,722,649

ARCLESS SWITCHING DEVICE

Ralph B. Immel, Williamsville, and Walter B. Guggi, Snyder, N. Y., assignors to Westinghouse Electric Corporation, East Pittsburgh, Pa., a corporation of Pennsylvania Application August 9, 1954, Serial No. 448,691

10 Claims. (Cl. 318—494)

Our invention relates to switching systems utilizing transistors and, more particularly, to such switching systems for connecting a single phase or a polyphase power source to an alternating-current motor or other single phase or polyphase load.

Conventional electromagnetically operated switching contactors used in the past for connecting a polyphase power source to a heavy load have been very large and expensive, have numerous mechanical moving parts that require extensive maintenance, and require considerable clearance between parts of opposite polarity due to the heavy arcing produced at the contacts upon opening of the electrical circuit. The arcing at the contacts additionally results in pitting and erosion thereof such as to require frequent replacement of the contact members.

In the copending application of R. L. Bright and G. H. Royer, titled "Transistor Power Control Circuits," Serial No. 420,904, filed on April 5, 1954, and assigned to the assignee of the present invention, there is described a type of power controller utilizing a transistor as the active switching element. As noted in this application, when the base of a PNP junction type transistor is positive with respect to both adjoining electrodes, the emitter-to-collector current thereof will be effectively cut off; the emitter-to-collector current will be driven to saturation when the base is at a sufficient negative polarity with respect to either of the adjoining electrodes. Likewise, when an NPN junction transistor is operated with the base negative with respect to both adjoining electrodes, the emitter-to-collector current will be cut off; when the base is sufficiently positive with respect to either of the adjoining electrodes, the emitter-to-collector current will be driven to saturation. The controller described in the Bright et al. application, while perfectly satisfactory in operation, nevertheless requires a somewhat complex control circuitry for the control of alternating currents, and additionally requires either a transistor having symmetrical characteristics or a plurality of transistors arranged to provide a symmetrical control characteristic. Such transistors may be relatively expensive due to the care that must be exercised in the manufacture thereof to provide suitable operating characteristics.

One object of our invention is to provide a switching system for use between a polyphase power source and a load associated therewith utilizing static elements to open and close circuits carrying heavy currents.

Another object is to provide such a switching system utilizing moving parts only in low power control circuits.

Still another object is to provide such a switching system utilizing transistor elements having non-critical characteristics adapted for use with very simple control circuitry.

A still further object is to provide such a switching system wherein only a minimum clearance is required between parts of opposite polarity.

Other objects and features will become apparent upon consideration of the following detailed description of our invention when taken in connection with the accompanying drawing, wherein.

Figure 1:
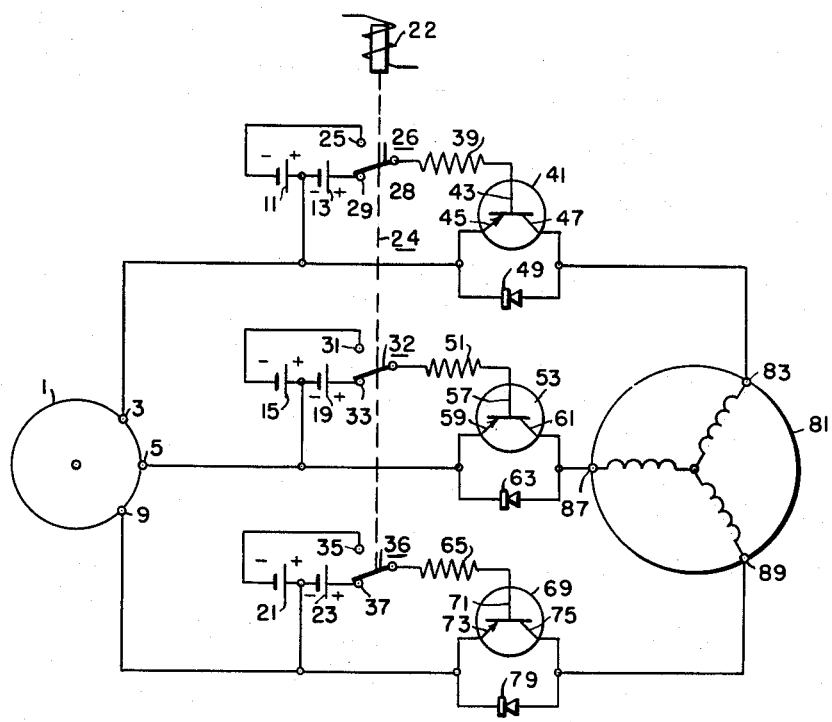
Figure 1 is a schematic diagram of a preferred embodiment of our invention.

In our invention, a transistor switch utilizing either an NPN or PNP junction transistor is inserted in each of the polyphase power lines between an alternating-current source and a motor or other load to be connected thereto. In parallel with each of the transistor switches is a half-wave rectifier polarized so as to provide a return path for current traversing the transistor elements from generator to load. The flow of current through the transistor elements is controlled by alternately connecting potential sources of opposite polarity between the base and one adjoining electrode of each of the transistors. A simple multi-pole, double-throw switch or relay having very small power control requirements is adapted for this latter operation.

More specifically, and with reference to the single figure of the drawing, there is shown a three-phase generator 1 having power terminals 3, 5 and 9, which is to be connected to a three-phase motor 81 having phase terminals 83, 87, and 89. While the motor windings are shown as Y-connected, the windings of the motor may be in either Y or delta. Inserted between terminals 3 and 83 is a PNP junction type transistor 41 having an emitter electrode 45 connected to generator terminal 3 and a collector electrode 47 connected to motor terminal 83. In parallel with the emitter-collector circuit of the transistor is a half-wave rectifier 49 poled so as to conduct current from motor terminal 83 to generator terminal 3. This rectifier conveniently may be a selenium, germanium, or silicon dry-type rectifier which has sufficient capacity to carry the maximum phase current required by the motor under full load conditions.

Similarly, between the terminals 5 and 87 and between terminals 9 and 89, there is inserted parallel-connected transistor 53 and rectifier 63, and parallel connected transistor 69 and rectifier 79, respectively.

To control the flow of current through transistor 41, potential sources 11 and 13 are alternately connected between emitter 45 and base 43 by means of switch element 26 of relay 24. The negative terminal of potential source 11 is connected to base 43 through contact member 25 of switch element 26 while the positive terminal of potential source 13 is connected to the base through contact member 29. The positive terminal of source 11 and the negative terminal of source 13 are connected to emitter electrode 45. The potential sources 11 and 13 may be batteries or other suitable sources of direct current. Similarly, the negative terminal of potential source 15 and the positive terminal of potential source 19 are connected to the base electrode 57 of transistor 53 by means of contact elements 31 and 33, respectively, of switch element 32. The negative terminal of potential source 21 and the positive terminal of potential source 23 are further connected to base electrode 71 of transistor 69 by contact members 35 and 37, respectively, of switch element 36.

Protective resistances 39, 51 and 65 are permanently inserted between the base electrodes of transistors 41, 53 and 69 respectively, and the respective switch members 26, 32 and 36 connected thereto so as to be in series with one of the potential sources at all times. The function of these protective resistances is to prevent the emitter-to-base current from becoming so excessive as to destroy the transistors.

The switch elements 26, 32 and 36 are mechanically interconnected and are actuated by a solenoid 22 so as to simultaneously close contact elements 25, 31 and 35 when the solenoid is energized, and to close contact elements 29, 33 and 37 when the solenoid is deenergized. The solenoid may be energized and deenergized by a series connected current source and a manually-actuated switch or any other means known to the art.

The magnitude of the output voltages of potential sources 13, 19 and 23 are chosen so as to be sufficient to bring the base potential of each of the transistors associated therewith to a positive potential with respect to both of the adjoining electrodes. Likewise, the magnitude of the output voltages of potential sources 11, 15 and 21 must be sufficient to bring the emitter-to-collector current to a saturated condition; i. e., so that a further change in emitter-to-base voltage will not appreciably affect the emitter-collector current.

In operation, let it be assumed solenoid 22 is initially deenergized. Under this condition, the flow of emitter-collector current through each of the transistors will be cut off. As the various rectifiers 49, 63 and 79 are poled to oppose current flow from generator 1 to motor 81, the motor is electrically disconnected from the generator. When the solenoid 22 is energized, current will flow through each of the transistors when the line in which it is connected is at a positive potential with one or both of the other lines. Assuming that terminal 9 is positive with respect to both terminals 5 and 3, current will flow through transistor 69 and will return through rectifiers 49 and 63 in accordance with the instantaneous voltages existing between the output terminals of the generator. Similarly, when terminal 5 is positive with respect to either of the other terminals, current will flow from generator to motor through the transistors, and return through the rectifiers connected in the other phase leads that are at a negative potential with respect to terminal 5. The same holds true when terminal 3 is positive with respect to terminals 5 and 9. Rotation of the motor thereby effected will continue until the solenoid 22 is subsequently deenergized. The motor will again be disconnected from the generator upon deenergization of the solenoid, but no troublesome arcing will occur inasmuch as no mechanical connection is broken in the power line between motor and generator.

Figure 2A:
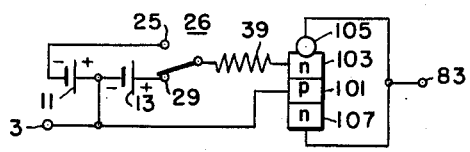
Figs. 2a and 2b illustrate types of semiconductor devices particularly suited for use in conjunction with our invention.
Figure 2B:
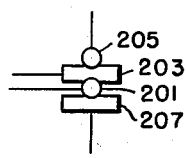

Types of semiconductor devices especially suited for use with our invention are illustrated in Figs. 2a and 2b. As shown in the drawings, these devices make use of four zones of opposite types of conductivity alternately disposed in a unitary structure. If desirable, a single protective envelope may enclose the structure.

As depicted in Fig. 2a, the semiconductor device may utilize a single crystal of germanium having two zones of N type conductivity 103 and 107 interleaved between which is a zone of P type conductivity 101. This crystal may be formed by the grown junction process described by Coblenz and Owens in their article "Operation of junction transistor" appearing in Electronics, August 1953, at page 156. On the surface of zone or electrode 103 is formed a second zone of P type conductivity 105 by the diffusion or alloy process described by Coblenz and Owens, supra, at page 158.

The zone of P type conductivity 101 serves as both emitter for a transistor comprising electrodes 101, 103 and 105 and as the anode for a rectifier comprising zones 101 and 107 wherein zone 107 is the cathode of the rectifier. Zone 103 serves as the base of the transistor section of the device and in the embodiment of our invention heretofore described serves as the control electrode of the transistor switches; similarly electrode 105 serves as the collector for the transistors. The method of connecting the device in one of the transmission lines between generator and motor of the circuit illustrated in Fig. 1 is depicted in Fig. 2a wherein corresponding identifying numerals refer to the same circuit elements. As shown, emitter-cathode electrode 101 is connected to generator terminal 3 and both collector electrode 105 and anode electrode 107 are connected to motor terminal 83. Base electrode 103 is connected to electrode 101 through protective resistor 39, switch 26, and D. C. sources 11 and 13 in the same manner as described with reference to Fig. 1.

The semiconductor device illustrated in Fig. 2b comprises two germanium crystals of the N-type conductivity 203 and 207 and two indium pellets 201 and 205. Pellet 201 is fused to both crystals 203 and 207 to form zones of P type conductivity therein, as described by Coblenz and Evans, supra, care being taken to avoid physical contact between the germanium crystals. Pellet 205 is fused only to crystal 203. Pellet 201 serves as both emitter for a transistor additionally including base electrode 203 and collector electrode 205, and as the anode of a rectifier having crystal 207 as the cathode thereof. The device may be connected in the circuit of Fig. 1 in the same manner as described with reference to the semi-conductor device of Fig. 2a.

It should be noted that while our invention has particular application in conjunction with the control of power to an alternating current motor, it is suitable for use with other types of load, either resistive or reactive in nature.

From the above description, it can be seen that our invention provides a relatively simple, arcless controller for connecting a single phase or polyphase generator to a single phase or polyphase load. Inasmuch as the transistor and rectifier are inherently physically small, and the relay controlling the flow of current through the transistors need not be large since it need interrupt only very small currents, the entire arrangement need occupy only a very small amount of space. Circuitry is quite simple and is adapted to utilize transistors having noncritical operating characteristics; it has been found that transistors which have been rejected as unsatisfactory for class A operation are perfectly satisfactory for use with our invention.

The invention is not to be restricted to the specific structural details, arrangement of parts on circuit connections herein set forth, as various modifications thereof may be effected without departing from the spirit and scope of this invention.

We claim as our invention:

1. In combination, an alternating-current motor having power leads connected to the phase windings thereof, power control means corresponding in number to the number of phase windings of said motor, each of said power control means comprising: transistor means including emitter, base, and collector electrodes connected in series with said power leads adapted to conduct current to said motor through the emitter-to-collector current conduction path thereof, unilateral current conduction means connected in parallel with said emitter-to-collector current conduction path adapted to conduct current having opposite direction of flow to that permitted by said transistor means, and means coupled to said transistor means adapted to selectively cut off current flow therethrough and permit saturating current flow therethrough.

2. In combination, a three-phase motor having connections for a three-phase source of power, power control means in each of the power leads to the phase windings each comprising: transistor means including emitter, base and collector electrodes connected to permit current flow to the phase windings through the emitter-to-collector current conduction path thereof; unilateral current conduction means in parallel with said transistor means adapted to permit current flow from said phase windings, and biasing means coupled between base electrode and one of the adjacent electrodes of each of said transistor means adapted to selectively bias the base electrode to a potential of one polarity greater than the potential on both of the adjoining electrodes and to a potential of the other polarity of a magnitude greater than the potential on either of the adjoining electrodes.

3. In combination, a three-phase motor having connections for a three-phase source of power, power control means in each of the power leads to the phase windings each comprising: transistor means including emitter, base and collector electrodes connected to permit current flow to the phase windings through the emitter-to-collector current conduction path thereof; unilateral current conduction means in parallel with said transistor means adapted to permit current flow from said phase windings, means coupled between the base and an adjoining electrode of each of said transistor means adapted to selectively impose a reversible voltage therebetween which is of a magnitude sufficient to cut off flow of emitter-to-collector current when of one polarity and is of a magnitude sufficient to insure saturation of emitter-to-collector current when of the opposite polarity.

4. A power controller for a polyphase alternating-current load comprising: transistor means in series with each of the polyphase power leads, each of said transistor means including emitter, base and collector electrodes connected to permit current flow to said load through the emitter-to-collector current conduction path thereof, unilateral current conduction means connected in parallel with each of said transistor means and adapted to permit current flow from said load, means coupled between base and an adjoining electrode of each of said transistor means adapted to selectively impose a reversible voltage therebetween which is of a magnitude sufficient to cut off current flow of emitter-collector current when of one polarity and is of a magnitude sufficient to insure saturation of emitter-to-collector current when of the opposite polarity.

5. A power controller for a polyphase alternating-current load comprising: transistor means in series with each of the polyphase power leads, each of said transistor means including emitter, base and collector electrodes connected to permit current flow to said load through the emitter-to-collector current conduction path thereof, unilateral current conduction means connected in parallel with each of said transistor means and adapted to permit current flow from said load, means coupled between base and an adjoining electrode of each of said transistor means adapted to selectively cut off current flow therethrough and permit saturating current flow therethrough.

6. A power controller for a polyphase alternating-current load comprising: transistor means in series with each of the polyphase power leads, each of said transistor means including emitter, base and collector electrodes connected to permit current flow to said load through the emitter-to-collector current conduction path thereof, single-phase rectifier means connected in parallel with each of said transistor means and adapted to permit current flow from said load, means coupled between base and an adjoining electrode of each of said transitor means adapted to selectively impose a reversible voltage therebetween which is of a magnitude sufficient to cut off current flow of emitter-collector current when of one polarity and is of a magnitude sufficient to insure saturation of emitter-to-collector current when of the opposite polarity.

7. A power controller for a polyphase alternating-current load comprising: transistor means in series with each of the polyphase power leads, each of said transistor means including emitter, base and collector electrodes connected to permit current flow to said load through the emitter-to-collector current conduction path thereof, single-phase rectifier means connected in parallel with each of said transistor means and adapted to permit current flow from said load, collector current control means for each of said transistor means each comprising a first potential source with the positive terminal thereof connected to the emitter electrode of the transistor means associated therewith, a second potential source with the negative terminal thereof connected to the emitter electrode of said transistor means associated therewith, and switch means adapted to selectively connect the negative terminal of said first potential source and the positive terminal of said second potential source to the base electrode of said transistor means associated therewith, said switch means associated with all of said transistor means being mechanically interconnected to simultaneously connect negative terminals of the potential sources to the base electrodes associated therewith and to simultaneously connect positive terminals thereof to the base electrodes associated therewith.

8. In combination, an alternating current motor having power leads connected to the phase windings thereof, power control means corresponding in number to the number of phase windings of said motor, each of said power control means comprising: transistor means including emitter, base and collector electrodes connected in series with said power leads adapted to conduct current to said motor through the emitter-to-collector current conduction path thereof, unilateral current conduction means connected in parallel with said emitter-to-collector current conduction path adapted to conduct current having opposite direction of flow to that permitted by said transistor means, said transistor means and unilateral current conduction means comprising a unitary semiconductor structure having four alternate zones of opposite conductivity type wherein one of the central zones is adapted to function as both emitter for said transistor and as an electrode for said unilateral current conduction means, and means coupled to said transistor means adapted to selectively cut off current flow therethrough and permit saturating current flow therethrough.

9. In combination, an alternating current motor having power leads connected to the phase windings thereof, power control means corresponding in number to the number of phase windings of said motor, each of said power control means comprising: transistor means including emitter, base and collector electrodes connected in series with said power leads adapted to conduct current to said motor through the emitter-to-collector current conduction path thereof, unilateral current conduction means connected in parallel with said emitter-to-collector current conduction path adapted to conduct current having opposite direction of flow to that permitted by said transistor means, said transistor means and unilateral current conduction means comprising a unitary semiconductor structure having four alternate zones of opposite conductivity type wherein one of the central zone is adapted to function as both emitter for said transistor and as an electrode for said unilateral current conduction means, the other central zone and the outer zone adjacent thereto respectively comprising the base and collector electrodes for said transistor means and the other outer zone functioning as the other electrode of said unilateral conduction means, and means coupled to said transistor means adapted to selectively cut off current flow therethrough and permit saturating current flow therethrough.

10. A power controller for a polyphase alternating current load comprising: transistor means in series with each of the polyphase power leads, each of said transistor means including emitter, base and collector electrodes connected to permit current flow to said load through the emitter to collector current conduction path thereof; unilateral current conduction means connected in parallel with each of said transistor means and adapted to permit current flow from said load, said transistor means and said unilateral current conduction means comprising a unitary semiconductor structure of four alternate zones of opposite conductivity type wherein one of the control zones is adapted to function as both emitter for said transistor means and as an electrode for said unilateral current conduction means, the other central zone and the outer zone adjacent thereto respectively comprising the base and collector electrodes for said transistor and the other outer zone function as the other electrode of said unilateral current conduction device; means coupled between base and an adjoining electrode of each of said transistor means adapted to selectively impose a reversible voltage therebetween which is of a magnitude sufficient to cut off current flow of emitter-collector current when of one polarity and is of a magnitude sufficient to insure saturation of emitter-to-collector current when of the opposite polarity.

No references cited.